United States Patent [19]

Ehrhardt

[11] Patent Number: 4,512,593
[45] Date of Patent: Apr. 23, 1985

[54] TRACKING TRAILER CONSTRUCTION

[76] Inventor: Henry B. Ehrhardt, 723 E. Highland Dr., Arlington, Wash. 98223

[21] Appl. No.: 475,629

[22] Filed: Mar. 14, 1983

[51] Int. Cl.³ .............................................. B60D 1/14
[52] U.S. Cl. ................................. 280/460 R; 280/489
[58] Field of Search .............. 280/460 R, 456 R, 489, 280/81 A, 86, 29

[56] References Cited

U.S. PATENT DOCUMENTS

| | | | |
|---|---|---|---|
| 3,534,981 | 10/1970 | Moulton | 280/489 X |
| 3,556,561 | 1/1971 | Gingue | 280/489 |
| 4,076,264 | 2/1978 | Chatterley | 280/460 R |

*Primary Examiner*—John A. Pekar
*Attorney, Agent, or Firm*—Harvey B. Jacobson

[57] ABSTRACT

A main frame is provided including front and rear end portions and the front end portion includes a pair of laterally spaced apart hitch structures for releasable hitching to a pair of complementary hitch portions carried by the rear of an associated towing vehicle. The rear end portion of the frame includes a pair of laterally spaced apart dependingly supported caster wheel assemblies which are each mounted from the frame for full 360° angular displacement relative to the frame about an upstanding axis. Connecting structure interconnects the caster wheel assemblies together for equal and simultaneous angular displacement relative to the frame and friction brake structure is operatively connected between the frame and at least one of the caster wheel assemblies frictionally resisting angular displacement thereof relative to the frame. The friction brake structure is adjustable and the laterally spaced apart hitch structures are carried by a pair of opposite side forwardly projecting tongue portions each pivotally supported from the main frame of the trailer for limited angular displacement about a horizontal transverse axis. Further, spring structure is operatively connected between the frame and each tongue portion yieldingly biasing the forward end thereof downwardly toward its lower limit position relative to the frame.

10 Claims, 9 Drawing Figures

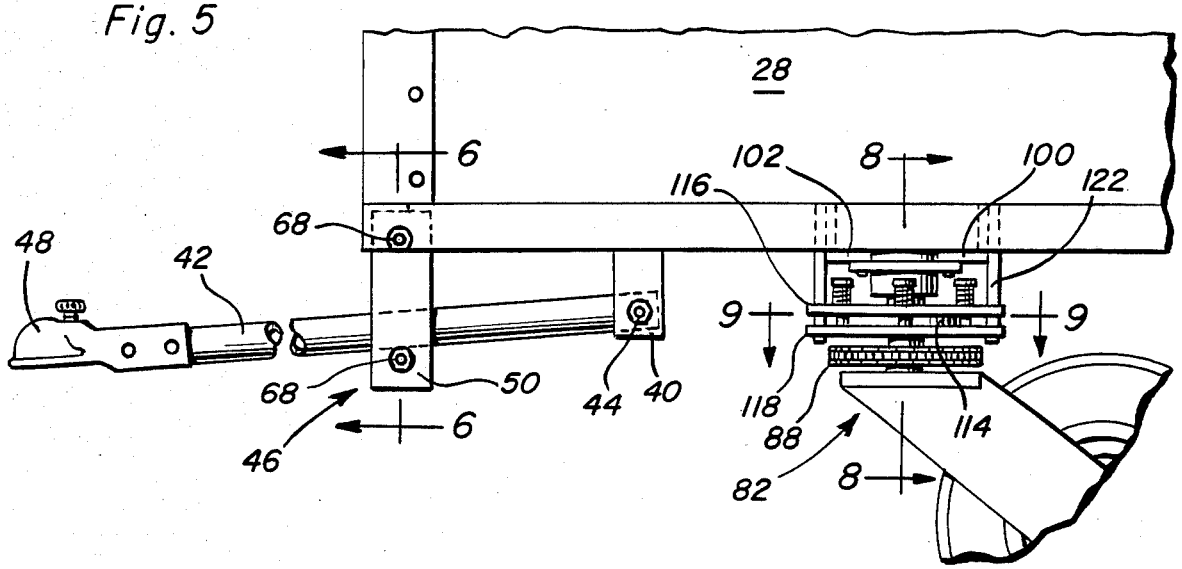
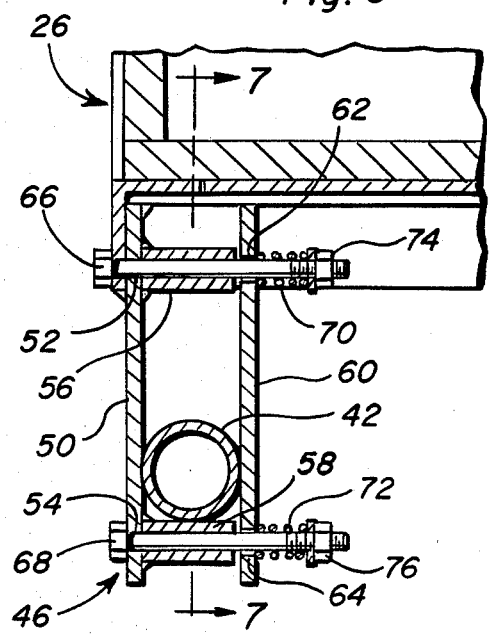
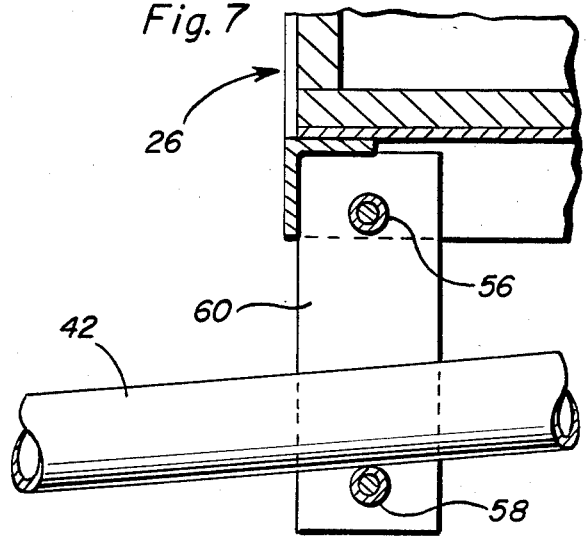
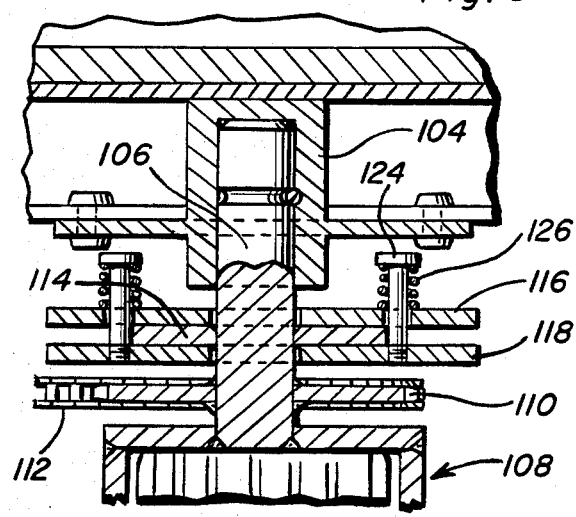
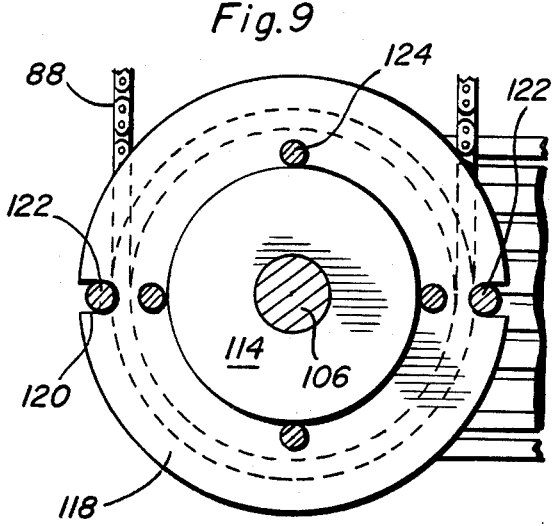

TRACKING TRAILER CONSTRUCTION

BACKGROUND OF THE INVENTION

Various forms of tracking trailers heretofore have been provided for coupling behind passenger vehicles and the like. Tracking trailers are to be considered as those types of trailers which will properly track ahead of the towing vehicle when the latter is operated in reverse. Such trailers considerably reduce the driving proficiency required by a person wishing to backup with a trailer coupled behind his or her vehicle.

Various forms of tracking trailers including some of the general structural and operational features of the instant invention are disclosed in U.S. Pat. Nos. 2,187,136, 2,475,174, 2,561,644, 3,322,440 and 3,601,427.

U.S. Pat. No. 2,187,136 discloses a caster wheel equipped trailer which is generally similar to the instant invention, but whose caster wheel assemblies are free to rotate (steer) independently of each other. U.S. Pat. No. 2,475,174 discloses a trailer including caster wheel assemblies and including a cross link connected between the caster wheel assemblies whereby the latter are connected for equal and simultaneous rotation (steering). Further, U.S. Pat. Nos. 2,561,644 and 3,332,440 disclose trailers equipped with steerable caster wheel assemblies but whose steering action is accomplished by angular displacement between the trailer and the associated towing vehicle. Finally, U.S. Pat. No. 3,601,427 discloses a yieldable pivoting connection between an extended tongue portion of a trailer and the trailer frame.

However, these previously known forms of trailers equipped with caster wheel assemblies and spring mounted trailer tongues do not provide the caster wheel steering control and torsional tongue resistance of the caster wheel assemblies and spring mounted tongue structure of the trailer of the instant invention.

BRIEF DESCRIPTION OF THE INVENTION

The tracking trailer of the instant invention includes opposite side caster wheel assemblies which are interconnected for simultaneous and equal steering movements throughout a full 360° and which include friction brake structure operatively associated therewith for adjustably frictionally resisting steering movements of the caster wheel assemblies. In this manner, when the trailer moves over a rough roadway and the caster wheels thereof bounce from rolling contact with the roadway, the caster wheel assemblies are not free to rotate (steer) indiscriminantly. Thus, when the caster wheel assemblies again return into contact with the roadway they are in substantially the same steering positions as they were when they left the roadway. Further, the pivoted twin tongue structure of the trailer of the instant invention is highly resistant to torsional forces and yet prevents the front end of the trailer from dipping as the rear end of the towing vehicle dips when moving over a rough roadway.

The main object of this invention is to provide a tracking trailer equipped with dirigible or caster wheel assemblies interconnected for simultaneous and equal rotation (steering) and further with friction brake structure being provided to prevent free rotation (steering) of the caster wheel assemblies.

Another object of this invention is to provide a tracking trailer equipped with a dual pivoted tongue structure wherein undulations of the rear end of the towing vehicle will not be transmitted directly to the tongue of the trailer and yet with the tongue structure constructed in a manner so as to absorb relative roll movements between the towing vehicle and the trailer.

Still another important object of this invention is to provide an improved tracking trailer whose structural components may be readily inspected and serviced when needed.

A final object of this invention to be specifically enumerated herein is to provide a tracking trailer in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is an enlarged fragmentary side elevational view of a second form of tracking trailer constructed in accordance with the present invention and which is identical to the trailer illustrated in FIGS. 1 through 4, but which includes a second form of adjustable brake structure for frictionally braking rotation (steering) of the caster wheel assemblies;

FIG. 6 is an enlarged fragmentary transverse vertical sectional view taken substantially upon the plane indicated by the section line 6—6 of FIG. 5;

FIG. 7 is a fragmentary vertical sectional view taken substantially upon the plane indicated by the section line 7—7 of FIG. 6;

FIG. 8 is an enlarged fragmentary transverse vertical sectional view taken substantially upon the plane indicated by the section line 8—8 of FIG. 5; and FIG. 9 is an enlarged fragmentary horizontal sectional view taken substantially upon the plane indicated by the section line 9—9 of FIG. 5.

DETAILED DESCRIPTION OF THE INVENTION

Figure 1:
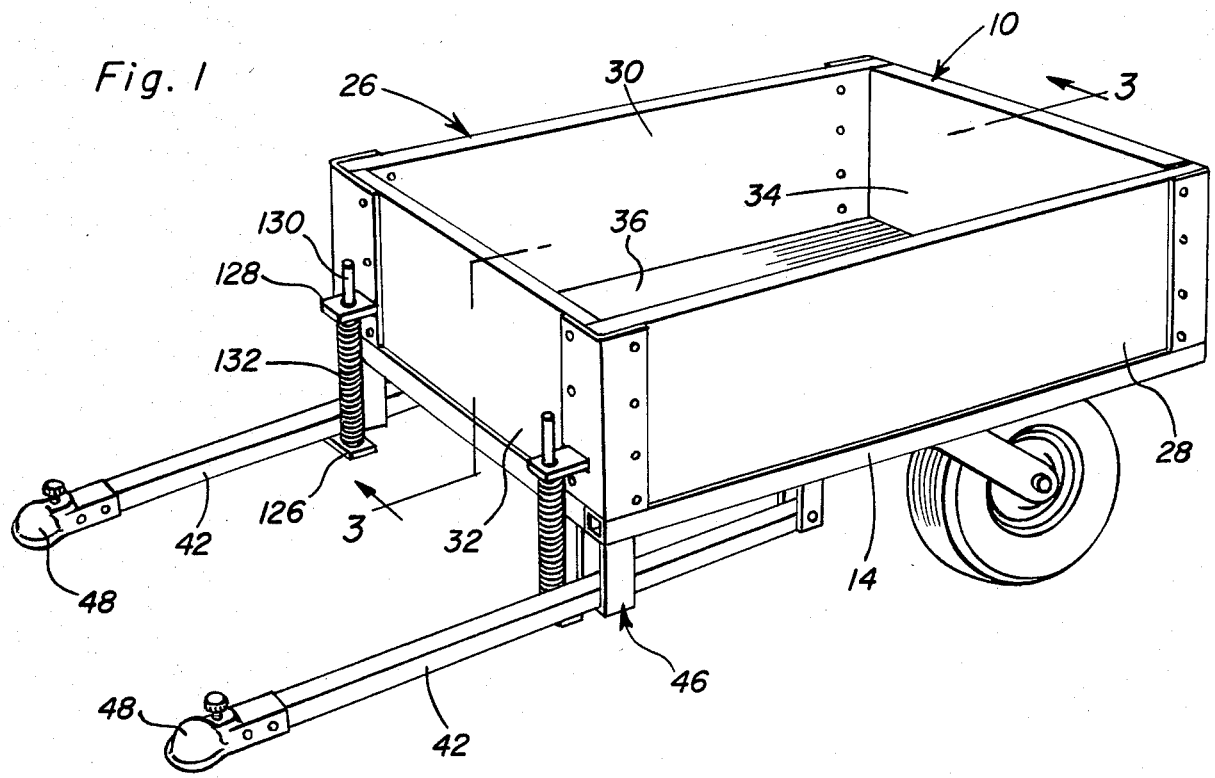
FIG. 1 is a perspective view of a first form of tracking trailer constructed in accordance with the present invention.

Referring now more specifically to the drawings the numeral 10 generally designates the tracking trailer of the instant invention. The tracking trailer 10 includes a generally rectangular main frame referred to in general by the reference numeral 12 and including opposite side longitudinal members 14 and 16 interconnected by front and rear transverse members 18 and 20. In addition, a pair of mid-length transverse frame members 22 and 24 extend between and rigidly interconnect the mid-portions of the longitudinal members 14 and 16.

The trailer 12 includes a body comprising an upwardly opening load bed referred to in general by the reference numeral 26 and the body includes opposite side walls 28 and 30 interconnected at the forward ends by a front wall 32 and having a rear tailgate 34 operatively associated with and swingable into and out of position extending between the rear ends of the side walls 28. Of course, the body 26 also includes a bottom wall 36.

Each of the longitudinal members 14 and 16 includes a pair of laterally spaced depending brackets 40 between which the rear end of a corresponding forwardly projecting tongue 42 is pivotally secured by a pivot fastener 44. The forward ends of the tongues 42 are thus vertically swingable relative to the frame 12. The forward ends of the longitudinal members 14 and 16 include dependingly supported bracket assemblies 46 in which the mid-portions of the tongues 42 are gudingly engaged for limited vertical swinging. The forward ends of the tongues 42 include ball socket defining hitch structures 48 for coupling to a pair of ball hitch members mounted and spaced transversely of the rear of a towing vehicle.

The bracket assemblies 46 each include a fixed outer side depending mounting plate 50 having a pair of upper and lower transverse bores 52 and 54 formed therethrough and a pair of spacing sleeves 56 and 58 are end abutted against the inner surface of the mounting plate 50 about the bores 52 and 54 and secured in position by welding. Each bracket assembly 46 additionally includes an inner mounting plate 60 provided with vertically spaced bores 62 and 64 corresponding to the bores 52 and 54 and through which bolts 66 and 68 pass through the bores 52 and 54 as well as the sleeves 56 and 58 are received. The ends of the bolts 66 and 68 passed through the bores 62 and 64 have compression springs 70 and 72 disposed thereon as well as threaded adjustment nuts 74 and 76. Accordingly, the compression springs 70 and 72 yieldingly bias the plate 60 toward engagement with the opposing ends of the sleeves 56 and 58. However, the tongues 42 are of transverse dimensions slightly greater than the length of the sleeves 56 and 58. Accordingly, the tongues 42 are frictionally engaged between the opposing sides of the plates 50 and 60. Further, the upper sleeves 56 defines upward limits of swinging movement of the tongues 14 and 16 and the sleeves 58 define lower limits of swinging movement of the tongues 14 and 16.

Figure 2:
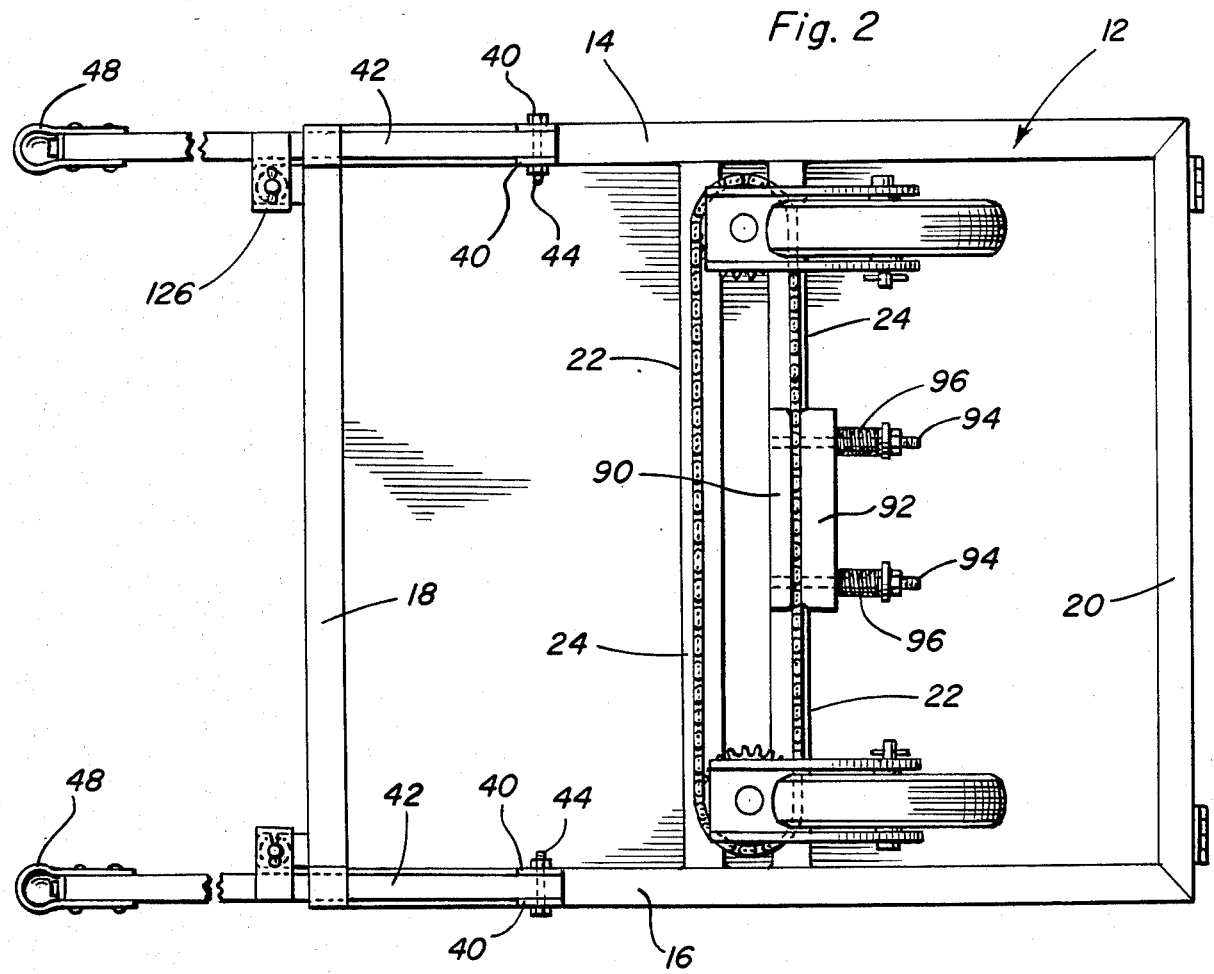
FIG. 2 is an enlarged bottom plan view of the trailer illustrated in FIG. 1.
Figure 3:
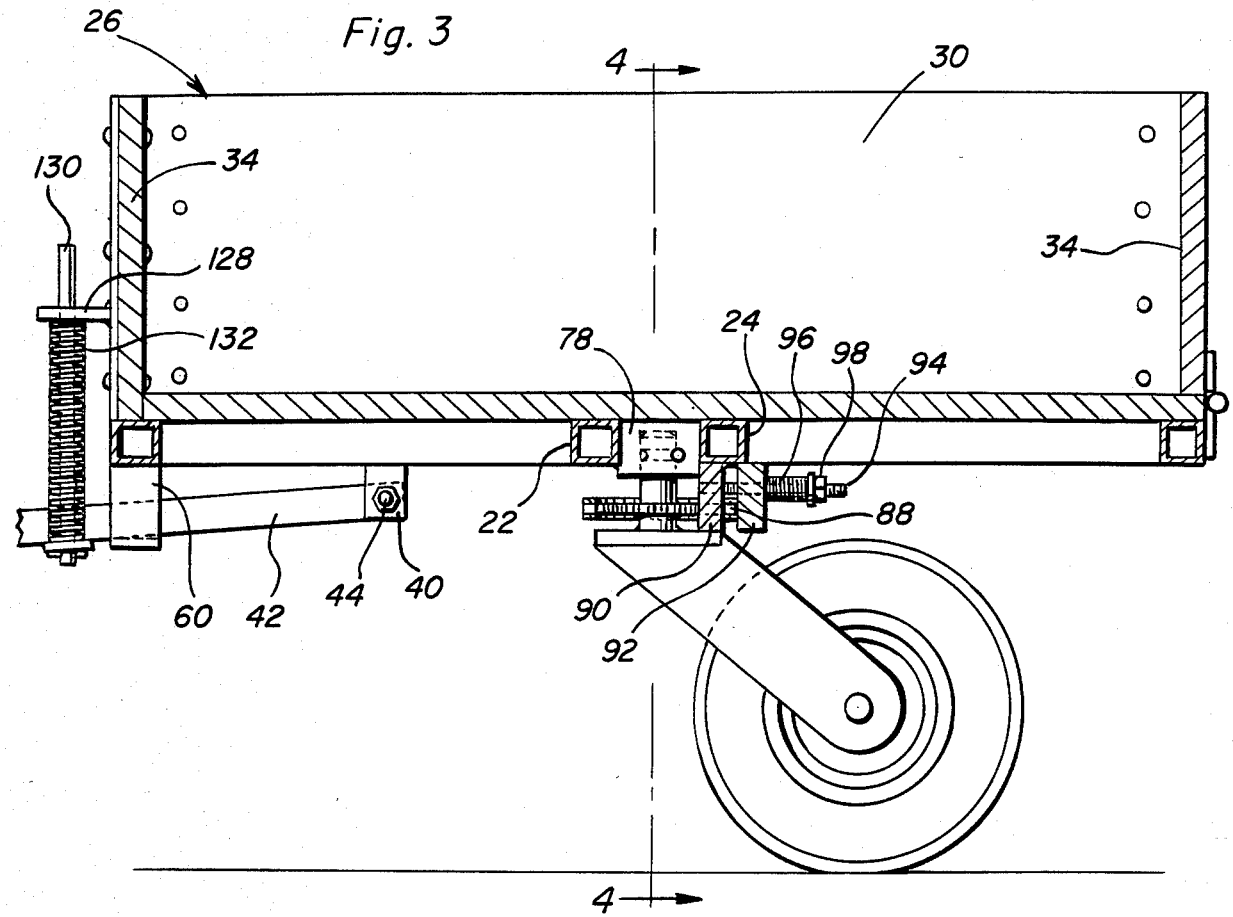
FIG. 3 is an enlarged fragmentary longitudinal vertical sectional view taken substantially upon the plane indicated by the section line 3—3 of FIG. 1.
Figure 4:
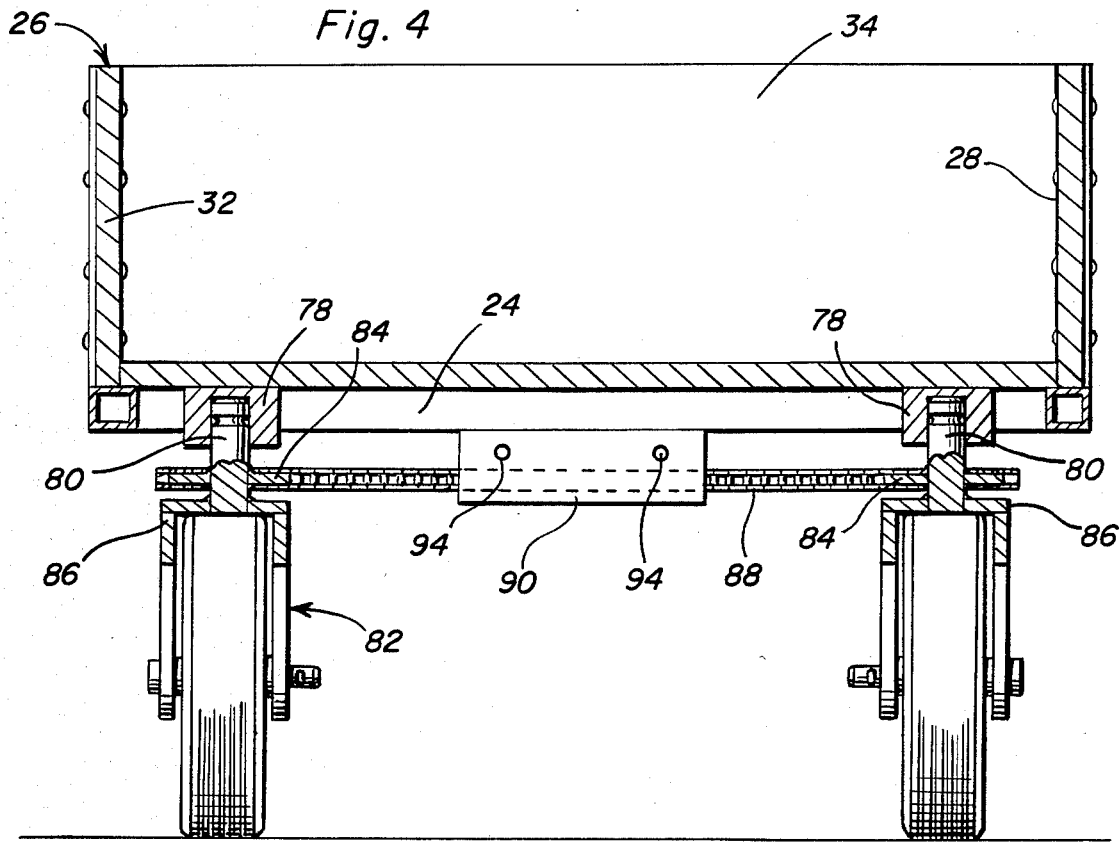
FIG. 4 is a transverse vertical sectional view taken substantially upon the plane indicated by the section line 4—4 of FIG. 3.

With attention now invited more specifically to FIGS. 2 through 4 of the drawings, it may be seen that a pair of mounting blocks 78 are secured between the pairs of corresponding ends of the transverse members 22 and 24 and that each mounting block 78 retentively journals the upper end of an upstanding mounting shank 80 of a caster wheel assembly referred to in general by the reference numeral 82. In addition, each mounting shank 80 includes a sprocket wheel 84 mounted thereon intermediate the corresponding mounting block and the wheel journalling frame 86 thereof and an endless chain 88 is trained about the sprocket wheels 84 whereby the sprocket wheels are connected together for equal and simultaneous angular displacement. In addition, the mid-portion of the transverse member 24 supports a stationary friction block 90 intermediate its opposite ends and closely forward of the rear reach of the chain 88 and the stationary friction block 90 supports a horizontally shiftable friction block 92 therefrom on a pair of support studs 94. Each of the studs 94 has a compression spring 96 disposed thereon rearward of the shiftable friction block 92 and a threaded adjustment 98 is threaded on the rear end of each shank 94 and thus serves to adjustably compress the corresponding spring 96. The rear reach of the chain 88, accordingly, is friction braked against longitudinal displacement transversely of the frame 12. Of course, by adjusting the nuts 98, the friction drag on the rear reach of the chain 88 may be adjusted as desired.

With attention now invited more specifically to FIGS. 5, 8 and 9 of the drawings, it may be seen that the tubular transverse frame members 22 and 24 may be replaced by angle members 100 and 102 and that bearing journals 104 may be supported between corresponding ends of the angle members 100 and 102 with the upper ends of the shanks 106 of a pair of caster wheel assemblies referred to in general by the reference numerals 108 rotatably supported from the journals 104. The caster wheel assemblies 108 include sprocket wheels 110 corresponding to the sprocket wheels 84 and a chain 112 corresponding to the chain 88 is trained about the sprocket wheels 110. In addition, each of the shanks 104 rigidly supports a brake rotor 114 therefrom and a pair of friction discs 116 and 118 are loosely disposed on each shank 106 above and below the corresponding rotor 114. The friction discs 116 and 118 are of a larger diameter than the rotor 114 and includes registered diametrically opposite pairs of radially outwardly opening notches 120 which embracingly receive longitudinally spaced portions of depending mounting studs 122 supported from the angle members 100 and 102. In addition, a plurality of circumferentially spaced mounting pins 122 are carried by the lower friction disc 118 and project upwardly through bores provided therefor in the friction disc 116. The upper ends of the mounting pins 122 include diametrically enlarged heads 124 and compression springs 126 are disposed about the mounting pins 122 beneath the heads 124 and above the friction disc 116 and serve to yieldingly downwardly bias the friction disc 116 into frictional engagement with the upper side of the rotor 114 and to upwardly yieldingly bias the friction disc 118 into frictional engagement with the underside of the rotor 114. Accordingly, each of the rotors 114 is frictionally braked.

The trailer 10 includes rear opposite side caster wheel assemblies which are rotatable a full 360° and which are interconnected for equal and simultaneous rotation. In addition, either the connecting chain or each of the caster wheel assemblies 108 is frictionally braked against free rotation. Accordingly, when the trailer is travelling over rough ground and the wheels of the caster wheel assemblies thereof leave the ground or roadway, the caster wheel assemblies are not free to rotate (steer) in a free manner. Thus, when the wheels of the caster wheel assemblies return to engagement with the ground or roadway, they are in generally the same rotated positions as they were when they left the ground or roadway. In addition, because of the pivotally mounted tongues 14 and 16, the tongues 14 and 16 may oscillate a limited amount relative to the frame 14. Each of the tongues 14 and 16 includes a stationary apertured mounting plate 126 which projects inwardly therefrom and each side of the front of the load bed 26 includes a similar apertured mounting plate 128 vertically registered with the corresponding mounting plate 126. A support shaft 130 is supported from each mounting plate 126 and projects upwardly therefrom through the corresponding mounting plate 128 and has a compression spring 132 disposed thereabout between the corresponding mounting plates 126 and 128. Thus, the forward ends of the tongues 14 and 16 are yieldingly biased toward their lower limits of swinging relative to the frame 12.

When the vehicle behind which the trailer is being towed moves over an undulating roadway so that the rear end of the vehicle moves up and down relative to the roadway, the pivotal mounting of the tongues 14 and 16 enables the trailer frame 12 to maintain a substantially horizontal position. Further, when the vehicle towing the trailer rolls relative to the latter, the pivotal mounting of the tongues 14 and 16 from the frame 12 allows such relative roll movement without placing undue stresses on the tongue structure of the trailer 10.

Of course, when it is desired to operate a towing vehicle in reverse the caster wheel assemblies will automatically swing approximately 180° and thus enable the trailer 10 to be steered while the towing vehicle is being operated in reverse.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A tracking trailer including a main frame having front and rear end portions, said front end portion including a pair of laterally spaced apart hitch means for releasable hitching to a pair of complementary hitch portions carried by the rear of an associated towing vehicle, a pair of caster wheel assemblies, means mounting said caster wheel assemblies in laterally spaced apart depending relation from the rear end portion of said frame for full 360° angular displacement relative to said frame about corresponding upstanding axes, interconnecting said caster wheel assemblies together for equal and simultaneous angular displacement relative to said frame, and frictionally resisting angular displacement of at least one of said caster wheel assemblies relative to said frame.

2. The tracking trailer of claim 1 wherein said means mounting said assemblies from said frame includes adjustment means for selectively varying the friction braking action effected on said caster wheel assemblies.

3. The tracking trailer of claim 1 wherein said means mounting said assemblies from said frame includes adjustment means operatively connected directly between said frame and said connection means.

4. The tracking trailer of claim 1 wherein said means mounting said assemblies from said frame includes adjustment means operatively connected directly between each of said caster wheel assemblies and said frame.

5. The tracking trailer of claim 1 wherein said pair of laterally spaced apart hitch means includes a pair of elongated forwardly projecting opposite side towing tongues each having its rear end pivotally supported from said main frame for angular displacement about a horizontal transverse axis, limit means operatively associated with said frame and tongues establishing upper and lower limits of swinging movement of the forward ends of said tongues, and means yieldingly biasing said tongues toward their lower limit positions.

6. The tracking trailer of claim 5 wherein said limit means also includes friction brake structure operative to frictionally brake said tongues against angular displacement relative to said frame.

7. The tracking trailer of claim 6 wherein said friction brake structure includes adjustment means operative to adjustably vary the friction braking thereof on said tongues.

8. A tracking trailer including a main frame having front and rear end portions said front portion including a pair of laterally spaced apart elongated and forwardly projecting towing tongues each having its rear end pivotally supported from said frame for angular displacement about a horizontal transverse axis, limit means establishing upper and lower limits of oscillation of each of said towing tongues, spring means yieldingly biasing said towing tongues toward their lower limit positions, the rear end portion of said frame including a pair of laterally spaced apart dependingly supported caster wheel assemblies each mounted for full 360° angular displacement relative to said frame about a corresponding upstanding axis, connecting means interconnecting said caster wheel assemblies together for equal and simultaneous angular displacement relative to said frame.

9. The tracking trailer of claim 8 including friction brake means operatively associated with each of said caster wheel assemblies for frictionally braking the latter against angular displacement relative to said frame.

10. The tracking trailer of claim 9 wherein said friction brake means includes means operative to adjust the friction braking action thereof on said caster wheel assemblies.

* * * * *